INVENTORS
Charles W. Ferguson and
BY Robert H. Welker
Nobbe & Swope
ATTORNEYS

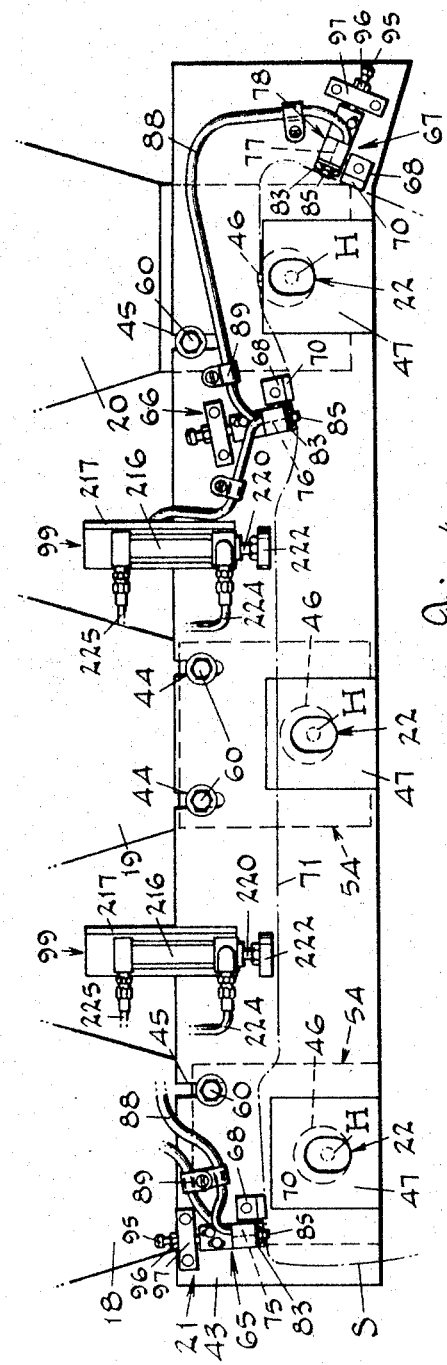
Fig. 4.
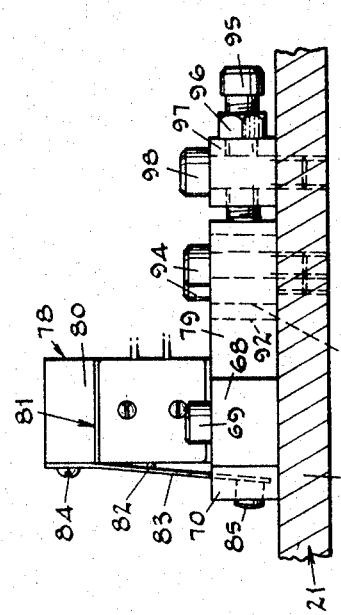
Fig. 6.
Fig. 5.
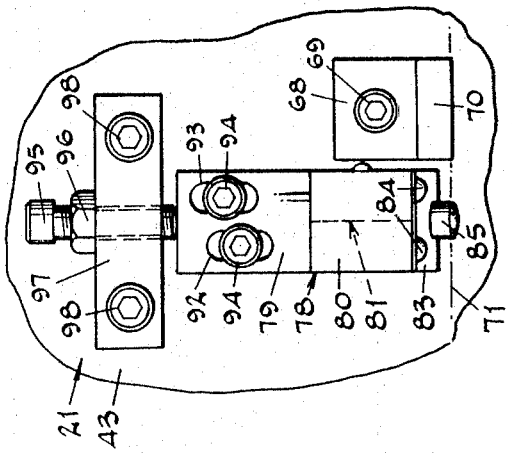
INVENTORS
Charles W. Ferguson and
BY Robert H. Welker
Nobbe & Swope
ATTORNEYS INVENTORS
Charles W. Ferguson and
BY Robert H. Welker Nobbe & Swope
ATTORNEYS INVENTORS
Charles W. Ferguson and
BY Robert H. Welker
Nobbe & Swope
ATTORNEYS

United States Patent Office 3,461,615
Patented Aug. 19, 1969

3,461,615
DRILLING MACHINES
Charles W. Ferguson and Robert H. Welker, Perrysburg, Ohio, assignors to Libbey-Owens-Ford Glass Company, Toledo, Ohio, a corporation of Ohio
Filed Mar. 24, 1966, Ser. No. 537,097
Int. Cl. B24b 7/00, 9/00; B28d 1/02
U.S. Cl. 51—81                                  8 Claims

ABSTRACT OF THE DISCLOSURE

A machine for simultaneously drilling a plurality of holes in sheets of glass or other materials. A first plurality of drills are located beneath the sheet and a second plurality of drills above said sheet in axial alignment with the first plurality of drills. Means are also provided for clamping the sheet to be drilled in position on a horizontal support and for subsequently ejecting the drilled sheet from said support. The machine is placed in operation by accurate location of the sheet to be drilled on the support which initiates automatic and sequentially timed operation of (a) means for clamping the sheet in position, (b) means for moving the first plurality of drills simultaneously toward the sheet and their subsequent withdrawal therefrom, (c) means actuated by each of the first plurality of drills for moving the aligned drill of the second plurality of drills toward and away from the sheet, and (d) means actuated upon movement of the second plurality of drills to their inoperative position for releasing said clamping means and for actuating the sheet ejector means to effect removal of the sheet from said support.

---

This invention relates to a drilling machine and more particularly to an improved drilling machine for drilling a plurality of holes in a sheet.

Although not limited to any sheet material, the invention will be illustrated as embodied in a machine for drilling holes in glass sheets wherein it is conventional to drill a single hole by opposed drilling tools with one drilling tool moving only a sufficient distance to force the drilling tool into the glass a distance less than the thickness of the glass sheet and thereafter to complete the hole by the second drilling tool moving at least beyond the point of the first drilling tool to complete the hole. As is well known, this procedure eliminates the likelihood of the surface of the glass sheet to chip or break which may result from drilling a hole from one side only.

Recently, the trend in automobile styling has been towards the removal of the conventional frame around the side and/or door windows. Since the conventional frames have heretofore been a major portion of the support for the windows, this development has necessitated a new type of mounting means for the windows within the automobile. One method of mounting such unframed windows includes the provision of a plurality of openings or holes adjacent the lower portion thereof with a mounting member secured to said portion by means of securing devices extending through the openings.

As can readily be appreciated, when utilizing a plurality of openings adjacent the lower portion of the sheet it is extremely important that the openings in the glass sheet be accurately located with respect to each other and properly positioned in the sheet. This is not only necessary for the proper alignment of the openings in the sheet with the openings in the mounting member but also to accurately position the sheet or side window in the automobile. Any misalignment of the window with respect to the opening in a door, for example, will result in insurmountable problems not only in properly closing the opening but also in raising and lowering the window in the automobile door.

It is the primary aim of the present invention to provide improved apparatus for drilling a plurality of openings in a sheet.

Another object is to provide an apparatus for simultaneously drilling a plurality of openings in a sheet.

A further object is to provide an apparatus of the above type which eliminates all manual control except proper placement of the sheet.

A still further object is to provide apparatus of the above type which is capable of repeatedly drilling a plurality of openings accurately and rapidly.

Other objects and advantages of the invention will become more apparent during the course of the following description when read in connection with the accompanying drawings.

In the drawings, wherein like numerals are employed to designate like parts throughout the same:

FIG. 4 is a horizontal section taken on line 4—4 of FIG. 2;

FIG. 5 is an enlarged fragmentary plan view of a locator and control switch device;

FIG. 6 is an elevation of the device of FIG. 5;

In accordance with this invention, there is provided a drilling machine which is capable of accurately and simultaneously drilling a plurality of openings in a sheet and in which a drilling cycle is automatically initiated by merely locating the sheet to be drilled in its proper position on a support surface. Thereafter, the complete drilling cycle is performed without the usual required attention of the operator and upon completion of the cycle the drilled sheet is ejected from the machine which is then in position for the immediate reception of a subsequent sheet.

Figure 1:
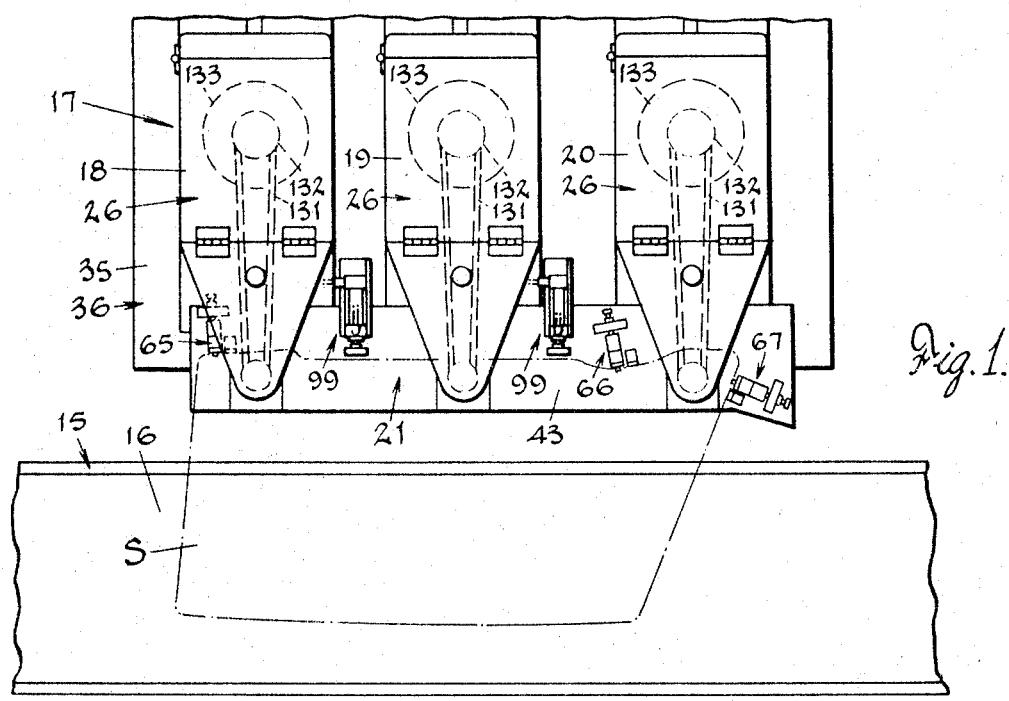
FIG. 1 is a plan view of multiple glass drilling apparatus constructed in accordance with the present invention.
Figure 2:
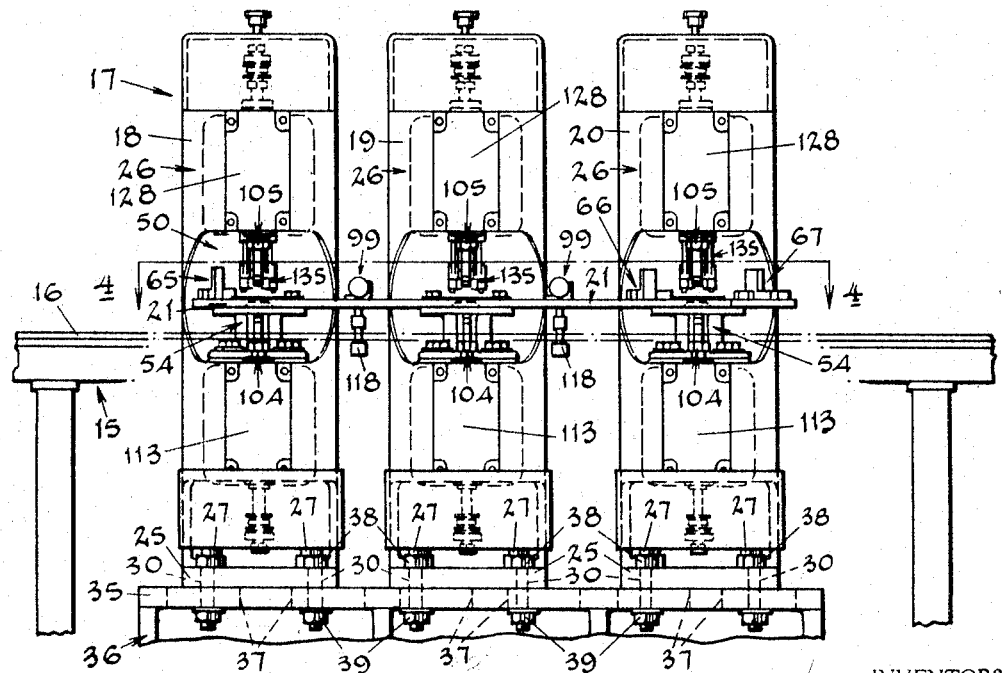
FIG. 2 is a front elevation of the apparatus.

Referring now particularly to FIGS. 1 and 2 of the drawings, there is shown a conventional conveyor system, designated by the numeral 15 and including a horizontally disposed substantially continuous belt 16, upon which a series of flat sheet articles, such as of glass, are carried toward and away from successively occurring production operations. Arranged at one side of the conveyor is a so-called multiple or "gang" drilling apparatus, constructed in accordance with the invention, and designated in its entirety by the numeral 17. The apparatus includes a plurality of individual drill units 18, 19 and 20 and, as viewed in FIG. 1, these drill units are located in conformity with one preferred arrangement of holes to be drilled which in the present instance, upon reference to a drill jig 21 in FIG. 4, will be seen to include three holes H located along one margin of a glass sheet S.

As here employed, the term "drill jig" is used to broadly define a mechanical device that is designed to accurately locate each one of a plurality of identical sheets of glass or parts with reference to the axis of one or more drilling tools.

While in no way restricting the invention, a glass sheet, as illustrated at S, may be said to be a typical pattern-cut sheet of glass having an outline conforming to the upper area of a door opening of an automobile and having a series of holes in one or the lower margin of the sheet by which it is mounted in the usual regulator means contained within the door. From the indicated positions of the drilling units 18, 19 and 20, it is believed apparent that the same should be adapted to be shifted until the vertical axes of their associated drilling tools are accurately aligned with the axis of a hole to be drilled. To this end, a "drill jig" 21 (FIG. 4) is provided with openings 22 located as determined by the specification for each individual series of side windows or "parts" formed from the sheet. When the drilling units have been shifted to a desired position with reference to the drill jig they are rigidly secured to a support and the drill jig 21 secured, in a like manner, to the units as will hereinafter be more fully described.

Figure 3:
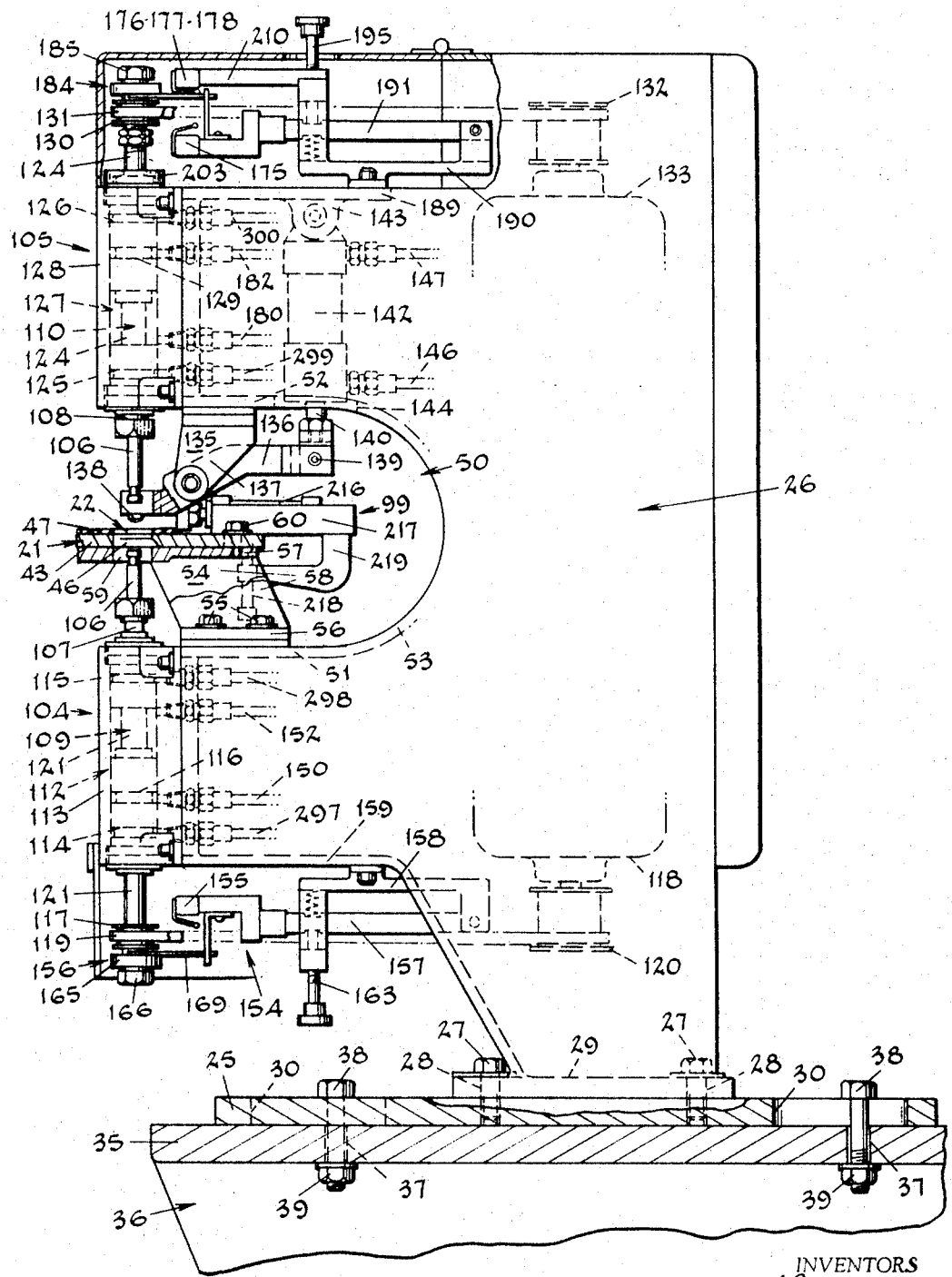
FIG. 3 is a side elevation of one drilling unit of the apparatus.

One suggested way of mounting the drilling units for rapid and convenient adjustment in position to suit a particular array of openings or holes in a glass sheet is broadly shown in FIGS. 2 and 3. The illustrated mounting includes a "sole" plate 25 which is fixedly secured to the lower portion of a drilling unit housing 26, which forms a part of the support structure, as by bolts 27 passed through openings 28 provided in the mounting flanges 29 of the unit housing and threaded into the plate 25. Each plate 25 is formed with a plurality of elongated openings or slots 30 located in parallel with a plane through the longitudinal axis of the housing 26. The sole plate 25 is carried on the upper surface or platform 35 of a base structure 36, which forms the remainder of the support structure and is adapted in one way or another to be permanently attached to a floor surface. The platform 35 is provided with a series of elongated openings or slots 37 formed in said platform at substantially right angles to the slots 30 in the plate 25. Thus, by means of bolts 38 passing through registering slots 30 and 37 and having securing nuts 39, each of the several drilling units can be adjustably shifted to increase and/or decrease the spaced distance between one another in directions afforded by the slots 37 and generally parallel with the lognitudinal axis of the drill jig 21. Likewise, each unit can be individually shifted "inwardly" or "outwardly" in the direction of the slots 30 until the axes of their drilling tools coincide with the axis of a hole 22 in the plate 21.

With regard to the "drill jig" 21, it will be seen upon further reference to FIGS. 3 and 4 to comprise a generally rectangular, elongated base member or sheet supporting means 43 in which the openings 22 are generally located in spaced relation to one marginal edge. The base member 43 is provided in or along the opposite marginal edge with inwardly directed notches 44 located substantially medially between its ends and similarly sized bolt openings or notches 45 located in close proximity to said ends. That is to say, the notches 44 are located in substantially equally spaced relation to a transverse plane passing through the centrally disposed "second" hole 22. The bolt receiving notches 45 are similarly located with reference to more outwardly located, or the "first" and "third," holes 22.

As will be noted in connection with FIGS. 3 and 4, the holes 22 in base member 43 are not entirely circular in outline but are elongated or substantially oval to provide suitable area for clearance of coolant fluid and debris from actual cutting or drilling area. For this purpose, the walls 46 of the holes are flared outwardly and downwardly as indicated in circular dotted line. The area of the upper surface of the base member surrounding each of the holes 22 are covered with a layer 47 of protective material, such as of synthetic rubber or preferably plastic of a urethane composition. These layers provide the supporting surfaces for the glass which are non-abrasive and greatly assist in the placement and ease of removal of the glass sheet from the drill jig 21.

The base member 43 is received, in its functional position, in a medially disposed reentrant or ("throat") portion 50 of each housing 26 which is defined by lower and upper parallel walls or surfaces 51 and 52, respectively, and an inwardly disposed integral curved portion 53. A bracket 54 is secured by bolts 55 to the lower wall 51 of each drilling unit 18, 19 or 20. The brackets 54 are formed with a base portion 56 through which bolts 55 are threaded into the related walls 51 and an upwardly disposed, horizontal platform 57 with supporting walls 58 being arranged therebetween. The base member 43 of the drill jig 21 is carried on the upwardly disposed surfaces of the platforms 57 which are also formed with openings 59 aligned or placed in registry with the openings 22 of the base member 43 before the same is rigidly secured on a bracket 54 by bolts 60 received into threaded openings in the platforms.

Thus, the drill jig 21 is initially located by placement of the base member 43 thereof on the platform 57 of bracket 54 associated with the centrally disposed or second drilling unit, such as the unit 19 as herein shown. When the vertically aligned opening 22 of the base and opening 59 of the bracket 54 are brought into registration, tightening of the bolts 60 in the notches 44 of the base member and into the threaded openings in the platform 57 will firmly position the drill jig 21 with respect to the centrally disposed drill unit. Now, with the longitudinal axis of the drill jig 21, if desired, substantially parallel to the longitudinal axis of the conveyor system 15, the outwardly located, or first and third, drilling units (18 and 20) can be shifted with the respect to the platform 57 until the openings 59 therein accurately register with the openings 22 thereabove in the drill jig 21. With the insertion of bolts 60 through the openings or notches 45 of the base member 43 and into the threaded openings of the brackets, the drilling units 18, 19 and 20 and the drill jig 21 will be assembled to provide a multiple organ drilling apparatus 17 rigidly mounted on the structural base 36 with the base and the unit housing forming the support means for the drilling means and the drill jig.

As herein employed, the term "gang" relates to the use of a plurality of units or cutting tools for the substantially simultaneous drilling of two or more holes in accurate, predetermined relation to one another.

The drill jig 21 has hereinabove been described as being provided with openings 22 that are arranged in spaced location with reference to one another according to a predetermined pattern established by the specification for the particular production "part." More importantly, this plate is provided with locator devices, as at 65, 66 and 67, for accurately positioning each one of a plurality of duplicate parts or sheets S with respect to the location of the openings 22. As seen in FIGS. 5 and 6, each sheet locator device or means essentially includes a block 68, secured by screw 69 to the upper surface of the plate, and equipped with a pad or layer 70 of non-abrasive material, such as of a suitable plastic composition. Returning briefly to FIG. 4, the blocks 68 are located according to the outline of the sheet S, which is shown in broken line indicated by the numeral 71, and with the surfaces of pads 70 disposed so as to accurately locate the edge of a sheet at one or more advantageous areas along one side of the sheet or part.

Closely associated with the block 68 of each sheet locator means is a control element provided with a switch device, herein designated at 75, 76 and 77. Each of these control elements include an L-shaped body member 78 including a base 79 with a vertically disposed post 80 at one end. The post 80 has a horizontally disposed notch 81 along one side thereof for receiving a switch device. The actuator pin 82 of each switch device carried by the front surface of each post 80 is adapted to be engaged by a spring-leaf lever 93 that is mounted at its upper end by screws 84 adjacent the top of the post. The lower end of the lever is equipped with a button 85 of non-abrasive material which, as shown in FIG. 5, is normally positioned, due to outwardly flexed formation of the lever 83, beyond the pad surface of the block 68. Stated otherwise, as the proximate edge area of a sheet is moved toward contact with the locator surface of the block 68, it simultaneously engages the button 85 to depress the lever. Consequently when the said edge area, indicated by the broken line 71 in FIG. 5, is in full and exact contact with the surface of pad 70, it will have sufficiently deflected the lever 83 inwardly to depress the pin 82 thereby placing the related switch device in circuit-closing condition. As will be more fully described hereinafter in connection with FIG. 12, the switch devices 75, 76 and 77 are wired "in series" through lengths of insulation tubing 88 held on the base member 43 by clips 89. This ensures that an electrical circuit, such as for initiating a drilling operation, will not be completed unless the glass sheet, as it is placed upon the drill jug 21 is positioned against all of the locator devices so as to engage and effectively close all of the related switch devices.

The body member 78 of each control element is adapted to be adjusted until the critical distance necessary to actuate the related switch device has been established by the distance of extension or protrusion of the surface of button 85 beyond the surface of the pad 70. For this purpose, the base 79 is formed with longitudinally extending parallel slots 92 and 93 in which screws 94, threaded into the base member 43, are received. Obviously upon loosening of these screws, the body can be adjusted forwardly or rearwardly, and even slightly angularly, until the desired position for the button 85 is obtained. To avoid inadvertent displacement of the body member, a "back-up" screw 95 with a lock-nut 96 is threaded horizontally through a block 97 and against the adjacent surface of the body member; said block being secured to the base member by screws 98.

Also mounted on the base member 43 along the rear marginal edge thereof are sheet ejector means, generally designated by the numeral 99, which will be described in more detail hereinafter.

As was stated above, the drilling of glass is most efficiently carried out by the use of a pair of axially aligned tubular, glass drilling tools that are operated in following sequences of operation to pierce the opposite surfaces of the glass or glass sheet until the openings thus formed are joined. This prevents undesired spalling of the corner areas of the hole at the surfaces of the glass as well as the objectionable creation of vents running into and oftentimes causing destructive fracture of the sheet. Thus, each drill unit 18, 19 and 20 is conventionally equipped with axially-aligned glass cutting or drilling means which are herein designated in the order of their operation as the lower or first drilling tool or means 104 and the upper or second drilling tool or means 105. Each drilling means or tool, having tubular drills 106 with cutting ends of fine diamond powder in a suitable matrix, includes chucks 107 and 108 in the respective and opposed ends of driving spindles 109 and 110.

Generally stated, the spindles are constructed to rotate the drills at a selected rate of speed while simultaneously urging them toward and actively into the material to be cut. While constituting no novel part of the instant invention, it is known that drilling spindles of this character at their ends opposite the drill chucks are equipped with suitable drive pulleys and therebetween slidably supported in cylinder blocks wherein rotatably supported pistons can be influenced by the application of a suitable fluid pressure to move the spindle bodily in one direction or the other.

A typical structure of the above general description is generally shown in FIG. 3 wherein the lower spindle 109 is positioned in and slidable relative to the cylindered chamber 112 of a block 113 by bearings 114 and 115 arranged in the respective ends thereof. Within the cylinder 112 and between the said bearings, a piston 116 is mechanically associated with the spindle in a known manner such that the shaft 121 of the spindle 109 will conventionally revolve freely therein while being movable therewith between the ends of the cylinder 112. Since the active or work stroke of the drilling tool 104 is in an upward direction and retracted in a downward direction, the pulley 117 is keyed to the lower extended end of shaft 121 and is actively associated with a motor 118 by belt 119 entrained about pulley 117 and drive pulley 120 on the out-put shaft of the motor.

Likewise, upper spindle 110 is slidably supported by bearings 125 and 126 in respective ends of cylinder 127 in a block 128. Between bearings 125 and 126, the shaft 124 of spindle 110 is similarly associated with a piston 129 as in the case of the piston 116 and shaft 121. Above the block 128, the shaft 124 is equipped with a pulley 130 connected by belt 131 to a drive pulley 132 on the out-put shaft of a motor 133.

According to this invention, a preferred manner of operation is contemplated by the accurate placement of a sheet on the drill jig 21 and closure of the aforementioned switch devices 75, 76 and 77. The switch devices act as means responsive to the location of the sheet in operative position to lower clamping devices 135 which act to positively maintain the sheet to be drilled on the drill jig 21 and to simultaneously start the upwardly-directed work strokes of the lower drilling means 104 associated with the drilling units 18, 19 and 20. As above noted, unless the "series" connected switch devices 75, 76 and 77 are fully closed, initiation of a work stroke by the lower drills cannot be effected. Which means that the start of a substantially automatic cycle of drilling operation can only be made by an operator when he places the control edge 71 of a sheet in full contact with the locator devices 65, 66 and 67 and in so doing actuates the switch devices associated therewith which will simultaneously activate the lower drilling tools and the clamping means.

Figure 12:
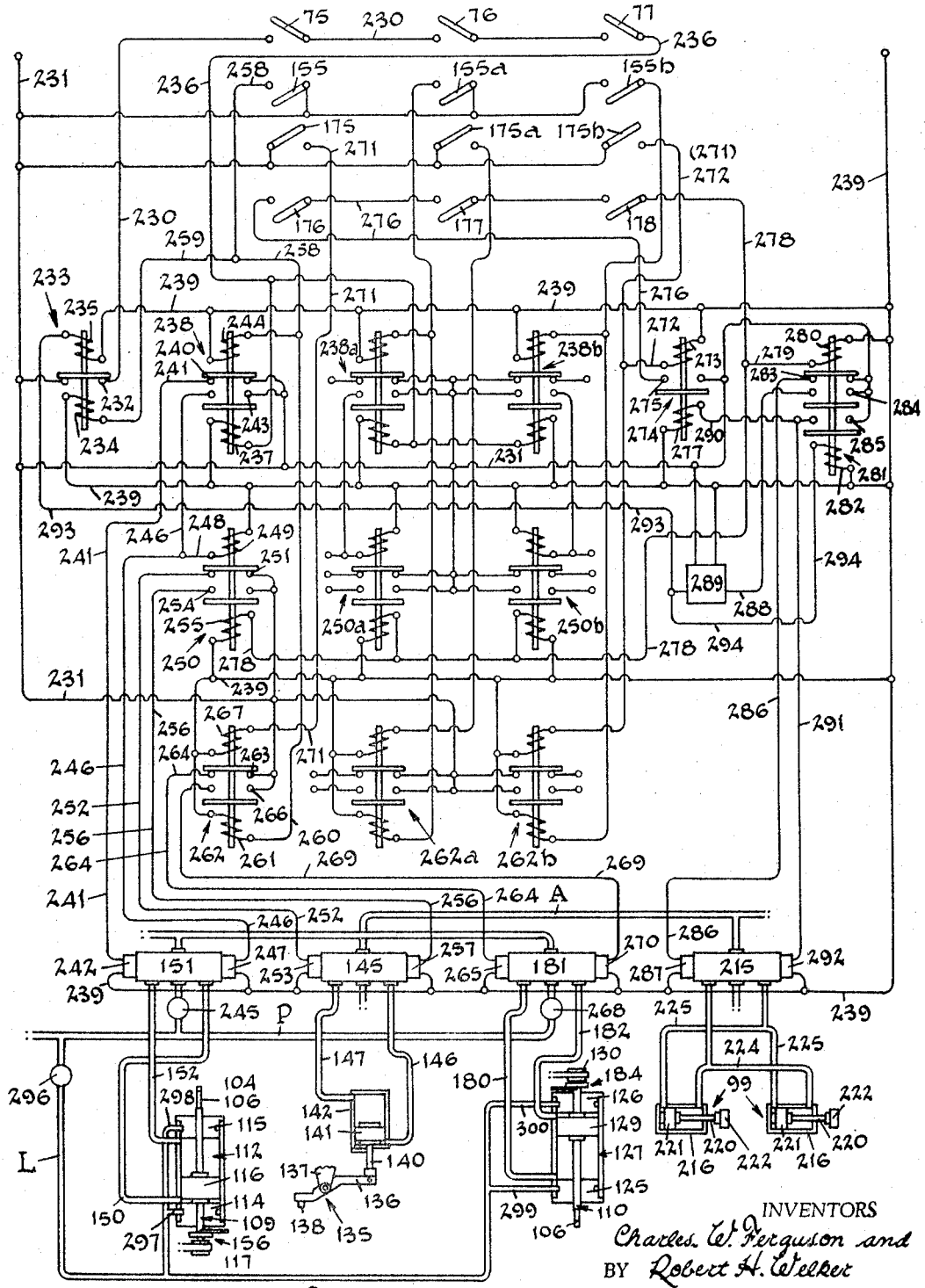
FIG. 12 is a diagrammatic view of an electrical system for the apparatus.

The clamping means includes a plurality of clamping devices 135, each comprising a lever 136 pivotally supported on a bracket 137 that is fixedly mounted on the upper wall 52 of the housing "throat" 50. The active end of each lever 136 is formed Y or yoke-shaped to encircle the drill 106, the fingers of said yoke being equipped on their lower surfaces with non-abrasive buttons 138. The opposite end of each lever is connected by pin 139 to the rod 140 of a piston 141 (FIG. 12) within a cylinder 142. In each instance, the cylinder 142 is supported by a bracket 143 within the upper area of the housing of the particular drilling unit and with the rod 140 passing through an opening 144 in the associated wall 52. Each cylinder 142 is connected to a source of fluid pressure, such as air, through suitable valve devices 145 by pipes 146 and 147 (FIG. 12).

Figure 9:
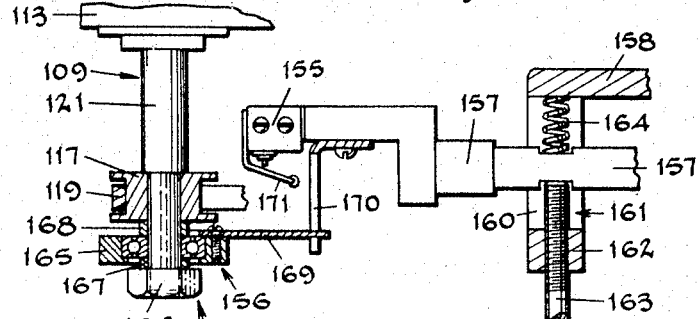
FIG. 9 is a detail view of another portion of the control means for the apparatus.

Now, as the work is firmly gripped by the clamping devices 135, pressure is directed to the cylinder 112 of each drill unit beneath the contained piston 116 by pipe 150 from a source of fluid pressure through one side or port of a four-way valve 151 (FIG. 12) while a pipe 152 connects the upper area of cylinder 112 to a second side or port of the valve which will be more fully explained in connection with FIG. 12. As the lower drilling tools 104 are thus moved upwardly through the registering holes 59 of the brackets 54 and openings 22, they approach and then engage the lower surface of the glass sheet to initiate the formation of the desired holes therein. As diagrammatically shown in FIG. 10, the depth of this first penetration is normally determined to be between one half to two-thirds of the thickness of a glass sheet, i.e. for $\frac{1}{4}''$ glass thickness this depth would be within a range of $\frac{1}{8}''$ to $\frac{5}{32}''$. The actual entry distance of the drills 106 is controlled by the position of a switch device which is adapted to produce reversal of the related valves 151 whereby the direction of pressure will be through the pipes 152 until the pistons 116 have been lowered into contact with the inner surface of the bearing 114. Since this simultaneously occurring phase of the multiple or "gang" drilling operation is being made by each of the lower drills, it is apparent that upon reaching the upper limit of their working or drilling stroke they must individually be caused to move downwardly or retracted from the work. This retracting action is accomplished by means of individual control devices 154, a typical embodiment of one such device being illustrated in FIGS. 3 and 9.

Each control device 154 or means responsive to a predetermined penetration of the sheet includes an adjustably mounted switch device or control means 155 and an actuator arm 156 therefor. As herein provided, the switch device is mounted at the free end of a lever arm 157 pivotally supported by a bracket 158 on the bottom wall 159 of housing 26. The arm passes between the legs or posts 160 of a bifurcated portion 161 formed on the bracket 158 with the legs of the bifurcated portion joined by a web 162. An adjusting screw 163, threadably mounted in the web 162, is adapted to vary the angular position of the arm 157 against the action of a coil spring 164 which adjustment raises or lowers the position of the switch device 155 and more importantly the exact position at which it will be engaged by the actuator arm 156.

The actuator arm 156 is incorporated in a ball-bearing supporting ring or collar 165 spaced between the pulley 117 on spindle shaft 121 and the retaining nut 166 therefor by ring washers 167 and 168. The actuator arm per se is substantially Y-shaped with the arms being fixed to the ring or collar 165 and the leg 169 loosely retained between the spaced legs of an L-shaped bracket 170 attached to the free end of the lever arm 157. The actuator 156 is thus adapted to engage and depress the finger 171 of control means or switch device 155 and by this action cause the completion of a circuit through said switch device.

Essentially, completion of the electrical circuit is made to ensure substantially rapid lowering or retraction of the lower drills from the work to move the same out of and away from the sheet and is experienced individually within each drilling unit. Of course, when the spindles 109 are lowered by the direction of pressure through the pipes 152, the related leg 169 of actuator arm 156 will be moved from engagement with the finger 171 to permit breaking of the circuit through the said switch device.

It is of course important that the lower drilling tools or means 104 have completed their operation before the upper drilling tools or means 105 are activated and lowered into engagement with the upper surface of the sheet. For this purpose, the control means 155 which reverses the movement of a lower drilling tool is used to simultaneously activate the fluid control means for the associated upper drilling tool.

Generally stated, operation of the upper drilling means, after activation, to the lowest limit of their work stroke is controlled by individual control means while at the upper limit of the retracting stroke control means responsive to return movement of all of the upper or second drilling means are activated to cause removal of the clamping devices 135 from engaging pressure on the glass sheet and then to cause operation of the ejector devices 99 whereupon the sheet S is rapidly shifted from the supporting surface of the plate 21 from which it is freely and substantially automatically delivered to the belt 16 of the conveyor system 15 and thus carried from the vicinity of the multiple drilling apparatus 17.

Figure 8:
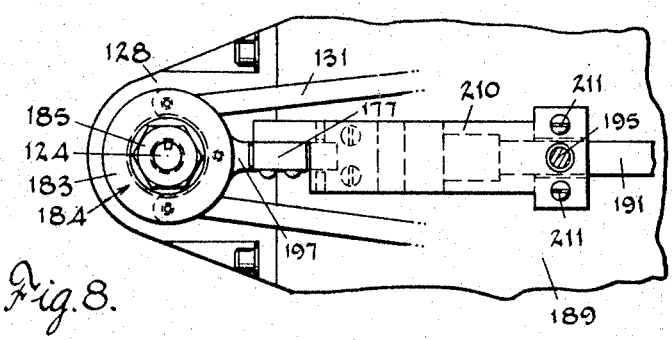
FIG. 8 is a plan view of the control means of FIG. 7.
Figure 7:
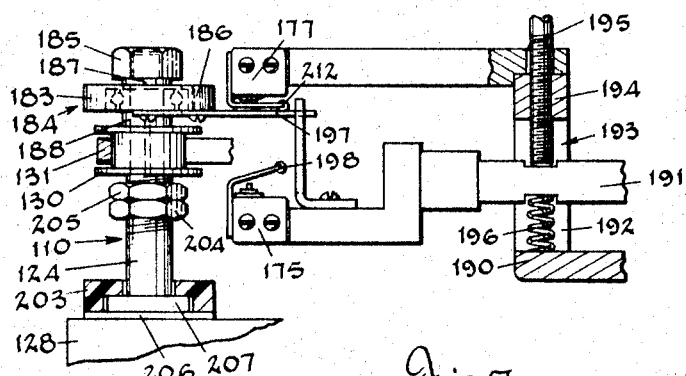
FIG. 7 is a detail view of a portion of the control means for the apparatus.

Thus, as illustrated in FIGS. 7 and 8, the vertical movement of each upper spindle 110 is effective within carefully defined limits to discontinue further drilling by the upper drills 106 at a predetermined lower limit of a working stroke and closure of a control means or switch device 175, and when the spindle reaches the upper limit of its retraction stroke, to assist in the completion of a "series" line circuit through inter-connected control means or switch devices 176, 177 and 178 to cause the devices 99 to eject the completely drilled sheet.

As stated earlier in connection with the cylinder 112 associated with the lower spindle 109, the cylinder 127 for upper spindle 110 in similar manner is connected, beneath the piston 129, by pipe 180 to one side or port of a four-way valve 181 (FIG. 12), which will serve to support the upper spindle in its retracted or idle position, and to the area of the cylinder above the piston by pipe 182 to a second side or port of said valve. Thus, upon closure of each switch device 155, which reverses the fluid control means or valve 151 of the lower drilling tool, will also activate the fluid control means or valve 181 associated with the aligned upper drilling tool to reverse the direction of pressure therethrough and to direct pressure via pipe 182 to produce lowering of the associated upper drilling tool 105 during duration of a working stroke. As well, when the switch device 175 of each drilling unit is brought to a closed condition, the related valve or fluid control means 181 is caused to reverse and again direct pressure through pipe 180 to immediately lift the drill 106 upon completion of a drilled hole.

To reverse the valve 181 of each upper drilling tool and raise the tool, each upper spindle 110 (FIGS. 7 and 8) is equipped with an actuator element 183 of a control device 184 located between the associated pulley 130 and a retaining nut 185. The actuator element 183, duplicating the previously described arm 156, has a bearing supporting collar 186 mounted on the pulley end of spindle shaft 124 and suitably spaced by ring washers 187 and 188 between said pulley and nut 185. The switch devices 175 of each drilling unit and series switch devices 176, 177 and 178, one such device 177 being illustrated in FIG. 7 by way of example, are generally supported on the top wall 189 (FIG. 3) of the housing 26 for each unit by a bracket 190.

This bracket, similar to bracket 158 hereinabove described, pivotally supports one end of a lever arm 191. As well, the lever arm passes between the legs or posts 192 of a bifurcated portion 193, of the bracket 190, which are joined at their free ends by a web 194. An adjusting screw 195, threadably mounted in the web 194, is adapted to vary the angular position of the lever arm 191, against the action of a coil spring 196, which adjustment raises or lowers the position of the switch device 175 carried on the free end thereof. The exact position at which the leg 197 of actuator arm 183 engages the finger 198 and produces closure of a switch device 175 is determined by the distance traversed by the upper drill to complete drilling of a hole but before the leading end of the drill is lowered into the vicinity of or through the opposite end of the completed hole.

Figure 11:
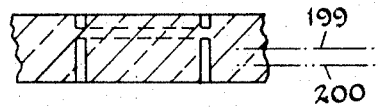
FIG. 11 is a view similar to FIG. 10 illustrating the completion phase of the drilling operation.

As graphically indicated in FIG. 11, the upper drills descend to and "plunge through" the remaining fragile thickness in completing formation of the hole and this action serves to "clean up" or ream the surface of the hole. Moreover, the sudden downward thrust acts to rapidly eject the resulting glass slug through the opening 22. One preferred downward limit of movement is illustrated by the line designated by the numeral 199.

To prevent further undesired movement of an upper drill 106 in the event of failure of the switch device 175 to immediately function or for the circuit controlled thereby to substantially instantaneously activate the related valve 181, means is herein provided to arrest downward movement of an upper drill upon completion of the formation of a hole. This means includes a nylon washer 203 and a pair of lock nuts 204 and 205 threadably carried by the spindle shaft 124 beneath the associated pulley 130. The washer 203 is located at or on the upper surface of the block 128 and supported on securing ring 206 and packing member 207 for the upper bearing 126. The distance between the surface of the washer 203 and the lower surface of the lock-nut 204 is determined by initially lowering the upper drill 106, by manual control, until the leading edge is brought into contact with suitable thickness gauging devices or "shims" placed on the surface of a layer 47 on the base member 43. When this distance has been determined, such as to permit further downward movement of the drill to a level indicated by a line designated by the numeral 200 in FIG. 11, the nut 204 will be substantially in contact with the washer 203 and there secured by the nut 205. In actual practice, it has been found that if the drill does not immediately retract upon engagement of the associated switch 175, the resiliency of the nylon washer will serve to absorb the "bump" of the nut 204 before the spindle moves upwardly. In any event, the washer assists in prevention of the drill's movement into the opposite end of the completed hole.

The upper switch device for each drilling tool, such as the switch 177, is carried on a bar 210 (FIG. 8) that is secured by screws 211 on the upwardly directed end surface of the web 194. The nominal position of the switch device is, of course, determined by the location of the leg 197 of actuator arm 191 when the upper end of the spindle 110 arrives at the limit of its retracting movement so that the switch device will be placed in circuit closing condition as the leg 197 engages the finger 212 of the associated switch and the spindle is brought to a halt.

The switch devices 176, 177 and 178 not only limit the upward movement of the associated drilling tools but are also essentially effective to cause raising of the clamping devices 135 and operation of the ejector devices 99 upon over-all completion of a drilling operation as evidenced by the return of all of the drilling tools 105 to their upper and idle positions. This is accomplished by a series circuit containing each of the switching devices 176, 177 and 178. Of course the control means 176, 177 and 178 may be located anywhere along the return path of the individual second drilling means so long as the drills have moved a sufficient distance to be out of engagement with the sheet.

In the first instance, a circuit is made (FIG. 12) to cause reversal of the related valve 145 to direct fluid pressure through pipe 147 to cylinder 142 whereupon the piston rod 140 will pivot the lever 136 on bracket 137 to raise the buttons 138 from the surface of the glass. In the second instance, a parallel circuit is made to produce operation of a valve 215 associated with each of the ejector devices 99.

These devices, which can be of any selected number, such as two, to remove the sheet from the drilling apparatus, include a cylinder 216 that is supported by a base 217 on the base member 43. The base 217 is provided to mount the same with a clamping member formed by a threaded rod 218 received in an integral arm 219. This manner of mounting the ejector devices 99 has been found very convenient since it permits a relatively high degree of freedom to obtain the most effective ejection action in the most advantageous areas. This is also true with regard to forward and rearward movement of the element to suitably space the associated disc with reference to the edge of the glass sheet.

The rod 220, of piston 221 within the cylinder 216, at its outer end carries an annular disc 222 of a non-abrasive material which produces the ejection action as it strikes the apropriate edge of the glass sheet. The cylinder is connected by pipes 224 and 225 to the valve 215 with pressure, such as air pressure, normally being directed by pipes 224 to the rod end of the cylinder. However, when the above described series line circuit through switch devices 176, 177 and 178, the valve 215 is activated to direct pressure through pipes 225 to the head ends of cylinders 216 whereupon the discs 222 perform their intended functions. Due to a control imposed by components of the electrical system of FIG. 12, the piston rods 220 are fully moved to the total distance of their "work" stroke to give impetus to the ejection action. After a momentary pause, the rods 220 and discs 222 are retracted by the application of pressure through the valve 215 and pipes 224 to the rod end of the cylinders 216.

To briefly review operation of the multiple or gang drilling apparatus herein disclosed, reference is now made to FIG. 12 wherein an exemplary electrical system as well as the sources of fluid pressure and control elements are illustrated. Preparatory to further description, however, it should be noted that the entire control circuitry for only one drilling unit has been fully set forth in this figure while the duplicate instrumentalities for the remaining drill units have been shown for the purpose of clarity and provide continuity of operation where deemed necessary.

During an idling phase, the valve 151 for each drilling unit 18, 19 or 20 is directing pressure by pipe 152 to the upper end of cylinder 112 (above the piston 116) for the lower drilling tool 104; the valve 181 is directing pressure by pipe 180 to the lower end of cylinder 127 (beneath piston 129) for the upper drilling tool 105; the valve 145 is directing pressure by pipe 147 to the upper end of cylinder 142 (above piston 141) for the clamping elements 135, and valve 215 is directing pressure by pipes 224 to the forward ends of cylinders 216 (ahead of pistons 221) for the ejector devices 99.

Line 230 from source line 231 through N.C. (normally closed) contacts 232 of R.S. (relay switch) 233 (having opposed solenoids 234 and 235 completes the circuit to one side of open L.S. (limit switch) 75, in series with open L.S. 76 and 77. As indicated hereinabove, L.S. 75, 76 and 77 are located on the glass sheet base member 43 and must all be fully engaged to start a drilling operation. When a sheet is properly positioned with reference to locator devices 65, 66 and 67, L.S. 75, 76 and 77, are closed and a circuit is completed by line 230 and 236 through solenoid 237 of R.S. 238 to source line 239.

R.S. 238 is equipped with N.C. contacts 240 which completes a circuit by line 241 through valve end 242 to source line 239 to energize the end 242 of valve 151 and connect pipe 152 to pressure source pipe P for cylinder 112, and also has N.O. (normally open) contacts 243 and opposed solenoid 244. According to the drilling procedure of this invention, valve 151 is connected to a supply pipe P through a regulator valve 245 which reduces the operative pressure at valve 151 for the lower cylinder 112. As shown, R.S. 238a and R.S. 238b are similarly actuated by suitable circuit lines from line 236 to initiate operation at the lower cylinders 112 of the second and third drilling machines (as shown).

Solenoid 237 acts to open contacts 240 while closing contacts 243 to establish a circuit from source 231 by line 246 through end 247 of valve 151 to source 239. This reverses valve 151 to direct pressure by pipe 150 to the lower end of cylinder 112 (beneath piston 116) to initiate upward operation of the lower drilling tool 104. Line 246 via branch line 248 completes a circuit through solenoid 249 of R.S. 250 to opposite source 239. R.S. 250 is equipped with N.C. contacts 251 which, through line 252 to end 253 of valve 145, operated said valve to connect pipe 147 from a source pipe of air pressure A to the head end of cylinder 145. R.S. 250 also has N.O. contacts 254 and opposed solenoid 255. This is also identical at R.S. 250a and R.S. 250b. When a circuit is made through solenoid 249 to source 239, contacts 251 are opened while contacts 254 are closed to complete a circuit from source 231 by line 256 through end 257 of valve 145 to source 239. This reverses valve 145 to direct air pressure by pipe 146 to lower end of cylinder 142 (beneath piston 141) to move clamping devices 135 down on the glass sheet to hold the same firmly on the sheet support means 47 carried by base member 43.

When the lower drilling tools 104 reach their upper limit of drilling, L.S. 155, in each instance (L.S. 155a and L.S. 155b), is closed to complete a circuit by line 258 through solenoid 244 of R.S. 238 to source 239; this operating to open contacts 243 while restoring the circuit of line 241 at reclosed contacts 240 thereby again operating valve 151 to direct fluid pressure through pipe 152 to upper end of cylinder 112 (above piston 116) to move the respective lower drilling tool 104 downwardly. Branch line 259, upon completion through solenoid 234 of R.S. 233 to source 239, opens line 230 at contacts 232 to L.S. 75, 76 and 77. By line 260, a circuit is completed through solenoid 261 of R.S. 262 to source 239. This is equally true for R.S. 262a and R.S. 262b. R.S. 262 is equipped with N.C. contacts 263, which by line 264 through end 265 of valve 181, operated said valve to connect pipe 180 to source of pressure P for cylinder 127, and also has N.O. contacts 266 and opposed solenoid 267. Each valve 181 is also connected to the main pressure supply pipe P but through a regulator valve 268. When a circuit is completed through solenoid 261 to source 239, contacts 263 are opened while contacts 266 are closed to complete a circuit by line 269 through end 270 of valve 181 to source 239. This reverses valve 181 to direct pressure through pipe 182 to upper end of cylinder 127 (above piston 129) to move related upper drilling tool 105 downwardly.

At the lower limit of drilling, L.S. 175, as well as L.S. 175a and L.S. 175b, are closed to complete a circuit from source 231 by line 271 through solenoid 267 of R.S. 262 to source 239 which operates to open contacts 266 and reclose contacts 263. This acts to restore circuit of line 264 to reverse direction of pressure at valve 181 from pipe 182 to pipe 180 to cylinder 127 (beneath piston 129) whereby the upper drilling tools 105 are raised or retracted. By branch line 272 (this is shown for convenience in theoretical line 271 from L.S. 175b), a circuit is completed from source 231 through solenoid 273 of R.S. 274 to source 239; this operating to close N.O. contacts 275 to complete a circuit through line 276 to one side of open L.S. 176, 177 and 178 from source 231. R.S. 274 also has opposed solenoid 277.

At the limit of upward retracting movement of each drill 106, and with L.S. 176, 177 and 178 closed, a "series" circuit is established from source 231 by line 278 (which must be completed through the series L.S. and thus ensuring that the three upper drills are fully retracted) through solenoid 255 of R.S. 250 to source 239. R.S. 250, thus opens contacts 254 and recloses contacts 251 to restore circuit of line 252 to end 253 of valve 145. This operates to again direct air pressure by pipe 147 to the upper end of cylinder 142 (above piston 141) to raise clamping device 135 from the sheet as rod 140 is moved outwardly.

By branch line 279, a circuit is made from source 231 through solenoid 280 of R.S. 281 to source line 239. R.S. 281 is normally actuated during energization of solenoid 282 to hold contacts 283 closed and contacts 284 and 285 open. While engaged, contacts 283 complete a circuit by line 286 through end 287 of valve 215 to source line 239 to direct air pressure from source A by pipes 224 to forward ends of cylinders 216 to hold ejector devices or discs 222 in the retracted position.

When contacts 284 are engaged, a circuit by line 288 is completed to activate T.R. (timer relay) 289. The energizing of solenoid 280 also engages contacts 285 to complete a circuit by line 290 through solenoid 277 of R.S. 274 to source 239; this acting at contacts 275 to break the circuit of line 276 to L.S. 175, 176 and 177 which thereby opens the "series" circuit of lines 278 and 279 to solenoid 280 of R.S. 281 and establishes the circuit for a subsequent drilling operation. During engagement of contacts 285, line 291 completes a circuit from source 231 through end 292 of valve 215 to source 239. This operates to direct pressure through pipes 225 to rear ends of cylinders 216 (behind pistons 221) to cause ejector discs 222 to remove the finished sheet from its location on drilling jig 21.

When T.R. 289 "times" out, a circuit is completed by line 293 through solenoid 235 of R.S. 233 to source 239 which acts to reclose contacts 232 thereby re-establishing circuit of line 230 to L.S. 75, 76 and 77 preparatory to a subsequent drilling operation. Also, the circuit by line 294 through solenoid 282 of R.S. 281 to source 239 causes opening of contacts 284 and 285 and reclosure of contacts 283 to re-establish the circuit of line 286 and reverse the direction of pressure in valve 215 to cylinders 216 from pipes 225 to pipes 224 (ahead of pistons 221) to retract discs 222 of the ejector devices 99. The timing interval set up by T.R. 289 insures that the ejector elements will make complete outward movement to fully remove the glass sheet from the drill jig 21. They are then retracted by restoration of line circuit 286 as the circuit of line 230 is simultaneously restored at contacts 232 of R.S. 233.

A lubricating supply line L is also provided for the bearings of all of the lower and upper cylinders, i.e. bearings 114 and 115 and bearings 125 and 126, which is believed to be a conventionally employed manner of directing a desired supply of fluid to the surfaces of the drilling spindles 109 or 110 as they move therethrough. This pipe L is connected to the main source P through a regulator valve 296. As herein provided the pipe L is connected by pipes 297 and 298 at lower block 113 to serve contained bearings 114 and 115, and by pipes 299 and 300 with regard to the bearings 125 and 126 of the block 128. It is also considered to be of common knowledge to those skilled in the art that sufficient quantities of the fluid can be, in one way or another, directed to the tubular or drills 106 to efficiently cool and reduce the resulting temperature of the drilling operation.

Operation

Figure 10:
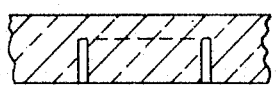
FIG. 10 is a fragmentary sectional view of a glass sheet illustrating the initial phase of a drilling operation.

A complete operative cycle of the multiple drilling apparatus of this invention is initiated when a sheet S is placed upon the protective layers 47 carried by the base member 43 of the drill jig 21 with the edge, indicated by line 71 in FIG. 4, in full contact with the surfaces of the locator means 65, 66 and 67 and operating to simultaneously put the control means 75, 76 and 77 in circuit-closing condition. As above described, this causes valves or fluid control means 145 and 151 to direct pressure to the related cylinders 142 and 112, respectively, thereby lowering the clamping devices 135 onto the sheet as the lower or first drilling means 104 are moved upwardly to perform the first phase of the drilling operation. When the desired depth of this drilling action has been reached, as indicated in FIG. 10, the individual control means 155 are engaged to produce reversal of valves 151 with resultant downward retraction of the drilling tools 104. Control means 155 cause the opening of the "series" circuit through control means switch devices 75, 76 and 77 which circuit would be otherwise maintained throughout the entire drilling operation. More importantly, the control means 155 cause the operation of valves or fluid control means 181 to produce the downward work stroke of the upper or second drilling means 105. As the spindles 110 are lowered from the position of FIG. 7, the leg 197 of each actuator element 183 is removed from engagement with the finger 212 of the control means 176, 177 and 178. At this time there is no active circuitry to these "series" switch devices. However, when the drills 106 complete the formation of holes through the sheet S, the completion of circuits is produced by circuits through the individual control elements 175. Each of these control elements cause the associated drilling tools 105 to be raised or retracted from the work stroke after which a circuit is completed through the control means or switch devices 176, 177 and 178. At the upper limit of the spindles 110, when all the legs 197 engage the fingers 212 of these switch devices, the valves 145 will be reversed to lift the clamping devices 135 from the sheet after which the valves 215 are made operable to actuate the ejector devices 99. The discs 222 of these devices are moved outwardly against the proximate edge of the sheet S with sufficient thrust as to move the sheet from the drill jig 21. The actual speed or impetus of motion causes the sheet to move in a substantially horizontal plane from the drill jig 21 and to then drop onto the conveyor belt 16 of the conveyor system 15. In the concluding phase of the operation, the line circuit to "series" switch devices 75, 76 and 77 is re-established; the line circuit to "series" switch devices 176, 177 and 178 is again opened, and the valve 215 is actuated to retract the discs 222 of the ejector devices 99.

As can readily be appreciated, the drilling apparatus provides for rapid and efficient drilling of a plurality of openings in a single sheet in a single operation and is capable of repeatedly drilling openings at exact locations on different sheets of the same size and configuration.

It is to be understood that the form of the invention herewith shown and described is to be taken as a preferred embodiment of the same, and that various changes in the shape, size and arrangement of parts may be resorted to without departing from the spirit of the invention.

We claim:

1. Apparatus for simultaneously drilling a plurality of holes at exact predetermined locations in a sheet, comprising means for horizontally supporting the sheet to be drilled, a plurality of spaced locator devices associated with said supporting means and engageable by said sheet for locating the same in operative position on said supporting means, a plurality of rotatable drills mounted in spaced relation to one another and movable toward and away from a sheet in operative position on said supporting means, a clamping device associated with each drill and with said supporting means and movable into and out of clamping position relative to said sheet, and electrically operable means associated with said locating means and actuated upon engagement of the sheet therewith for moving the clamping devices toward said supporting means to clamp the sheet thereagainst and for initiating movement of said drills simultaneously toward the said sheet.

2. Apparatus as defined in claim 1, in which said electrically operable means includes a switch device associated with each locator device, said switch devices being connected in series whereby operation of the clamping devices and the drills will not be initiated unless all of said switch devices are actuated by said sheet.

3. Apparatus as defined in claim 2, including means actuated by said drills upon a predetermined penetration of the sheet to move the same out of and away from said sheet, a second plurality of rotatable drills in axial alignment with said first plurality of drills, said means actuated by said first plurality of drills including means for moving said second plurality of drills toward said sheet, and means actuated by said second plurality of drills upon a predetermined penetration of the sheet to move the same out of and away from said sheet into inoperative position.

4. Apparatus as defined in claim 1, including sheet ejector means associated with said supporting means and automatically operable upon movement of the clamping means out of clamping position to engage the sheet and eject it from said supporting means.

5. Apparatus as defined in claim 3, including sheet ejector means, and means operable when said second plurality of drills are returned to inoperable position to move said clamping means out of clamping position, said means also causing operation of said sheet ejector means to engage an edge of the sheet and eject it from said supporting means.

6. Apparatus as defined in claim 5, including means operable upon movement of said first plurality of drills out of and away from the sheet to render the means associated with said locator means inoperable, and means for causing retraction of said ejector means and simultaneously placing the means associated with said locator means in operable condition.

7. Apparatus as defined in claim 3, including sheet ejector means, individual control means for each of said second plurality of drills, means for connecting said individual control means in series with one another, means operable when said second plurality of drills are returned to inoperative position whereupon a circuit will be completed through said individual control means to move said clamping means out of clamping position, and means operable upon movement of said clamping means out of clamping position for operating said ejector means to engage the sheet and eject it horizontally from said supporting means.

8. Apparatus as defined in claim 7, including means operable upon movement of said first plurality of drills to inoperative position to open the series circuit through the switch devices associated with each of the locator devices, and means operable upon movement of said second plurality of drills to inoperative position to cause retraction of said ejector means and simultaneously restore the series circuit through said switch devices.

References Cited

UNITED STATES PATENTS

| | | | |
|---|---|---|---|
| 1,973,204 | 9/1934 | Goss | 77—21 X |
| 2,864,209 | 12/1958 | Balsiger | 51—105 X |
| 2,910,896 | 11/1957 | Gasper | 77—21 |
| 2,941,338 | 6/1960 | Santschi | 125—20 X |
| 2,956,453 | 10/1960 | Frankenfield | 77—21 |
| 2,968,521 | 1/1961 | Gross | 346—85 |

HAROLD D. WHITEHEAD, Primary Examiner

U.S. Cl. X.R.

77—21; 125—20